United States Patent
Gfeller et al.

(10) Patent No.: US 6,643,469 B1
(45) Date of Patent: Nov. 4, 2003

(54) METHOD FOR IMPROVED WIRELESS OPTICAL COMMUNICATION AND FRAMES FOR USE IN A WIRELESS OPTICAL COMMUNICATION SYSTEM

(75) Inventors: Fritz R. Gfeller, Bonstetten (CH); Walter Hirt, Wettswil (CH)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/530,856
(22) PCT Filed: Nov. 18, 1997
(86) PCT No.: PCT/IB97/01461
§ 371 (c)(1), (2), (4) Date: May 5, 2000
(87) PCT Pub. No.: WO99/26364
PCT Pub. Date: May 27, 1999

(51) Int. Cl.[7] .............................................. H04B 10/04
(52) U.S. Cl. .................. 398/162; 398/123; 398/124; 375/222; 375/225; 370/311; 340/7.33; 455/343
(58) Field of Search .......................... 359/172, 135; 375/222, 225; 370/311; 340/7.33; 455/343

(56) References Cited

U.S. PATENT DOCUMENTS

| 5,559,804 A | * | 9/1996 | Amada et al. ............ 370/347 |
| 5,706,428 A | * | 1/1998 | Boer et al. .............. 370/342 |
| 5,818,826 A | * | 10/1998 | Gfeller et al. ........... 370/342 |
| 6,442,145 B1 | * | 8/2002 | De Lange et al. ......... 370/310 |

FOREIGN PATENT DOCUMENTS

| WO | WO95/28777 | 10/1995 |
| WO | WO97/25788 | 7/1997 |

* cited by examiner

Primary Examiner—Jason Chan
Assistant Examiner—Dzung Tran
(74) Attorney, Agent, or Firm—Law Office of Charles W. Peterson, Jr.; Louis P. Herzberg

(57) ABSTRACT

Method for wireless optical communication between a transmitting station and a receiving station, whereby the transmitting station provides a Request-to-Send (RTS) frame to the receiving station to announce the transmission of a data frame, the receiving station provides a Clear-to-Send (CTS) frame to the transmitting station in case of correct reception of the RTS frame, and the transmitting station subsequently sends the data frame to the receiving station. The RTS frame comprises Preamble (PA), Synchronization (SYNC), and Robust Header (RH) fields. The RTS frame further comprises a Source Address/Destination Address field (SA/DA) and a Cyclic Redundancy Check field (CRC). Adjusting the power level of the RTS frame to be different from the nominal transmission power level at which the data frame is sent, and by variable repetition coding within the Robust Header (RH) field of the RTS frame, allows a larger dynamic range of link quality estimation and improved collision avoidance properties. Depending on the chosen power level which can be higher or lower than the nominal transmission power level of the data transmission and a repetition coding depending on the chosen power level, a number of different possibilities to improve the connection between the participating stations are proposed and claimed.

25 Claims, 9 Drawing Sheets

METHOD FOR IMPROVED WIRELESS OPTICAL COMMUNICATION AND FRAMES FOR USE IN A WIRELESS OPTICAL COMMUNICATION SYSTEM

TECHNICAL FIELD

The present invention relates to optical communication systems in general, and the link quality and link quality estimation between a transmitting station and a receiving station in particular.

BACKGROUND OF THE INVENTION

For infrared device communication the Infrared Data Association (IrDA) has published a series of specifications designed to allow data communication between devices using the Infrared (Ir) medium. The paper of F. Gfeller and W. Hirt, "Request for Comments on Advanced Infrared (AIr) Physical Layer Specification (IrPHY)", presented at the IrDA Meeting in Toronto, Apr. 17, 1997, describes the concept of Robust Headers (RH) to support reliable collision avoidance with the Infrared Medium Access Control (IrMAC) protocol, which is responsible for coordinating the access to the infrared medium between infrared devices. The use of a RH in the physical layer header allows the coexistence of devices with different angular and range characteristics while maintaining the collision avoidance properties.

The International Patent Application PCT/IB96/00002 with publication number WO97/25788, filed on Jan. 3, 1996, describes an optical communication system enabling communication between several coexisting transmitting and receiving stations. In order to allow communication between coexisting stations, a robust physical layer header (herein referred to as Robust Header; RH) is employed which can be understood by all participating stations.

The two above-mentioned publications form the basis and the state of the art for the present invention and are incorporated by reference.

According to these references, infrared devices communicate in peer-to-peer mode where the transmitting station provides a Request-to-Send (RTS) frame to the receiving station to announce the transmission of a data packet, the receiving station provides a Clear-to-Send (CTS) frame in case of correct reception of the RTS frame, at least to the transmitting station, and the transmitting station subsequently sends the data frame to the receiving station. According to the general IrMAC frame format requirements, the RTS frame and the CTS frame comprise at least a Preamble field (PA), a Synchronization field (SYNC), and a Robust Header (RH) field. The PA field allows for reliable carrier sensing, symbol clock synchronization, and chip clock phase acquisition down to very low Signal-to-Noise Ratios (SNR). The PA field comprises symbols forming a periodic sequence of pulses, the number of slots per symbol (for example, L-slot Pulse Position Modulation; 4-slot (4-PPM) coding is proposed for AIrPHY) and the symbol content being known to all participating stations. The SYNC field, also a field with sequences of legal 4-PPM symbols, enables exact identification of the start of the RH field and consists of a certain predefined number of legal 4-PPM symbols. The RH field comprises according to the above referenced documents several fields of fixed length and known structure. By means of these fields, the receiving stations are informed about the signaling method used for data transmission. Further, the fields are used to provide other control information for the communication link or for the exchange of information to allow negotiation and/or adaptation of the data rate used for transmission in order to optimize the throughput depending on the quality of the channel.

The RTS frame further comprises, according to the above-mentioned IrDA Meeting paper, address fields called Source Address and Data Address (SA/DA) fields which follow the RH field. Further, this RH field is always robustly coded using repetition coding with a Rate Reduction of sixteen (RR=16) to provide maximum detection sensitivity. RR defines the level of repetition coding in order to ensure a correct data transmission; thus, every symbol is repeated RR times. The resulting redundancy in the symbol stream is intended to be exploited with suitable digital processing methods in the demodulator circuit and provide a SNR gain at the expense of a reduced data rate of 4/RR Mb/s. This is equivalent to individually matching the electrical receiver bandwidth to the reduced data rate. In contrast to this complex method the proposed method allows a virtual bandwidth reduction without having to physically change the receiver bandwidth and thus allowing a simple and optimal receiver implementation matched to the base rate of 4 Mb/s. The RR factor is defined to take on the values 1, 2, 4, 8, and 16, where RR=1 corresponds to the base rate of 4 Mb/s with 4-PPM and no repetition coding. The available data rates for the defined values of the RR factor are 4, 2, 1, 0.5, and 0.25 Mb/s. Every reduction step provides a SNR gain of nominally 3 dB electrical, corresponding to 1.5 dB gain in optical power. Thus, the nominal SNR gain increases from 0 dB to 12 dB electrical as RR changes from one to sixteen, respectively. Please note that for the remainder of this application relative power levels will be measured in the optical domain; a relative optical power level of xdB corresponds to 2xdB relative electrical power or 2xdB relative SNR change. The common data rate of 0.25 Mb/s with RR=16 must be supported by all systems within a communications cell, or within a subcell of a communication cell. This data rate is used in the RH field of every transmitted frame and serves to convey information relevant for the MAC and PHY layers. With increasing data rate reduction the communication system is capable of operating under successively worse SNR conditions. This can be used to gain a larger transmission range up to twice the transmission range at 0.25 Mb/s compared to the base rate of 4 Mb/s, or to maintain the link quality under hostile channel conditions such as high levels of background light. Further, repetition coding reduces the detrimental effect of interfering signals and can serve as power management by using a higher data rate for shorter distances which minimizes the energy consumption per transmitted frame.

In contrast to the RTS frame the CTS frame ends with the RH field. The RH field of the CTS frame comprises a RR* field instead of a RR field which is similar to the RR field in the RTS frame, except that it specifies recommendations for the RR to be used in the reverse direction based on an evaluation of the link quality or some other indication. Thus, it is a recommendation by the destination device that the source should use this parameter when communicating with it.

According to the IrDA Meeting paper, data frames comprise after the PA, SYNC, and RH fields a main body field which comprises a large data field which is followed by a Cyclic Redundancy Check (CRC) field. The CRC field is a variable repetition coded 32 bit field and is used in well-known manner for checking whether the transmission has been successfully accomplished.

The frames according to the prior art are transmitted with a single fixed optical power and use a fixed RR in the header. This does not allow to estimate the link quality for 4 Mb/s data rate (which corresponds to RR=1) with short packets, for example, RTS and CTS frames. Further, it does not provide sufficient SNR margins for expected parity mismatch conditions. Please note that the concept of parity for Ir systems has been introduced in the above-referenced IrDA Meeting publication.

The general object of the invention therefore is to provide absolution for improved collision avoidance properties and link quality estimation between the participating stations within the AIr concept.

It is thus a further object of the invention to provide a method which ensures only a connection between the stations if a certain prescribed SNR for a chosen RR is met.

It is another object of the invention to provide solutions for the introduction of special frames for link quality analysis.

It is a further object of this invention to propose an energy saving mode.

SUMMARY OF THE INVENTION

The invention as claimed is intended to meet these objectives. It provides a method for wireless optical communication between a transmitting station and a receiving station and frames for use in wireless optical communication systems, whereby the transmitting station provides a RTS frame to the receiving station to announce the transmission of a data packet, the receiving station provides a CTS frame in case of correct reception of the RTS frame, and the transmitting station subsequently sends a data frame to the receiving station. Please note that the CTS frame is sent from the receiving station at least to the transmitting station which issued the RTS frame. Both frames (RTS and CTS) comprise the generally required PA, SYNC, and RH fields. The RTS frame further comprises at least a Source Address/Destination Address field (SA/DA) and a Cyclic Redundancy Check field (CRC). Adjusting the power level of the RTS frame and/or the CTS frame to be different than the nominal transmission power level at which data frames are sent and by variable repetition coding within the robust header parts (for example of the RTS frame), allows a larger dynamic range of link quality estimation and improved collision avoidance properties. Depending on the chosen optical power level, which can be higher or lower than the nominal transmission power level of the data transmission, and a variable repetition coding depending on the chosen optical power level, a number of different possibilities to improve the connection between the participating stations are proposed and claimed.

A higher power level of the CTS frame but without variable repetition coding (i.e. RR=16), for example, increases the transmission range of the CTS signal with respect to the data packet. Thus, hidden terminals can be better reached, collisions are more efficiently avoided.

According to a preferred embodiment, the RTS frame is transmitted with a constant transmission power level less than the nominal transmission power level and with a Rate Reduction RR=16 of the RH field and a variable RR=1, 2, 4, 8, or 16 of the SA/DA field and the following CRC field. The transmission power level is chosen such that in combination with the chosen RR of the SA/DA field a correct decoding of the SA/DA field by the receiving station is achieved on average for a desired SNR. Advantageously, the transmission power level is in the range of 50% to 75% of the nominal transmission power level.

According to another embodiment of the invention, the RH field in the RTS frame comprises a differentiating sub-field (discovery field; DISC), designating the RTS frame as a discovery frame, and a broadcast destination address in the SA/DA field. This allows a procedure with discovery frames using increasing values of RR which are sent by a transmitting station until it receives an answer from a receiving station.

In a further preferred embodiment the fields of the RTS frame and of the CTS frame are transmitted with a higher transmission power level than the nominal data transmission power level. Additionally, the RTS frame comprises a trailer with at least one Trailer field (TR) which follows the CRC field with a lower power level than the nominal power level. The power level and RR of said RH field of said RTS frame are correspondingly chosen to produce equal detection sensitivity as with RR=16 and nominal power level. Thus, the RTS field comprises at least two different power levels. One purpose of this approach is to reduce the total length of the RTS frame and another purpose is to increase the dynamic range of the link quality analysis by counting illegal 4-PPM symbols in the trailer section. It is possible to use RR=2, 4, or 8 with the corresponding higher power levels which provide equal detection sensitivity as with RR=16 and nominal power. This condition is fulfilled with increased optical power levels of 4.5 dB, 3 dB, or 1.5 dB relative to nominal optical power and use of RR equal to 2, 4, or 8, respectively. Preferably, the higher power level of the RTS/CTS fields is twice the nominal power and therefore RR=4. Further, in another embodiment the lower power level of at least one TR field is advantageously half the nominal power because this means a reduction of 3 dB in optical power which is a preferred value when using a variable optical power level changing with 1.5 dB steps.

For a fixed RR≠16, for example RR=4, the pattern in said SYNC field is inverted in relation to the standard pattern to indicate to the receiving station that the RTS frame is sent with a different, and for the participating stations known, fixed RR (here RR=4).

Another preferred embodiment which can be used for evaluating the link quality makes use of a trailer which comprises several TR fields with different power levels, preferably the different optical power levels decrease in 1.5 dB steps starting with twice the nominal power level.

For reduced electrical power consumption when transmitting data at a very short range (app. 0.5 m distance) and increased data throughput for members (stations) with reduced optical power level, the optical power levels of the RTS, CTS, and data frames are transmitted according to a further embodiment with an optical power level less than the nominal power level and, instead of variable repetition coding within the robust header parts of said RTS/CTS frames, the SYNC field is inverted in relation to the standard pattern to indicate a reduced power level.

DESCRIPTION OF THE DRAWINGS

The invention is described in detail below with reference to the following schematic drawings, in which.

GENERAL DESCRIPTION

In the following, different applications are described which are possible on account of controlling the power level of the RTS frame and/or the CTS frame to be different from the nominal transmission power level at which data frames are sent and by variable repetition coding within the robust header parts of at least the RTS frame. A necessary requirement for operating the RTS/CTS media access protocol with the desired collision avoidance properties is the use of robust headers to detect transmission frames emitted from devices with increased detection sensitivity, and the establishment of infrared channel reciprocity as defined in the aforementioned IrDA Meeting paper for every device participating in the RTS/CTS protocol.

With RR=16, a frame can be transmitted twice the transmission distance compared to RR=1 when using the same power. Thus, RR=1 saves energy for short distances, since the frame is short. RR=16 ensures a repetition of 16 times so that the transmitted data frame will be less susceptible to disturbances, but the frame becomes relatively long. RR=1 vs. RR=16 corresponds to an equivalent difference of four times the transmission power. The RTS frame is sent to announce data frames to be transmitted to a specific receiving station and the transmission distance of the RTS frame should be as large as the transmission distance of the anticipated data frame. The transmission distance of the CTS frame (sent by the station which received the RTS frame) should be as large as possible in order to inform other stations about the link which was established with the transmitting station. By increasing or decreasing the power level in special applications and further variable repetition coding, especially of the RTS frame, the transmission distance and the link quality can be influenced.

Figure 1A:
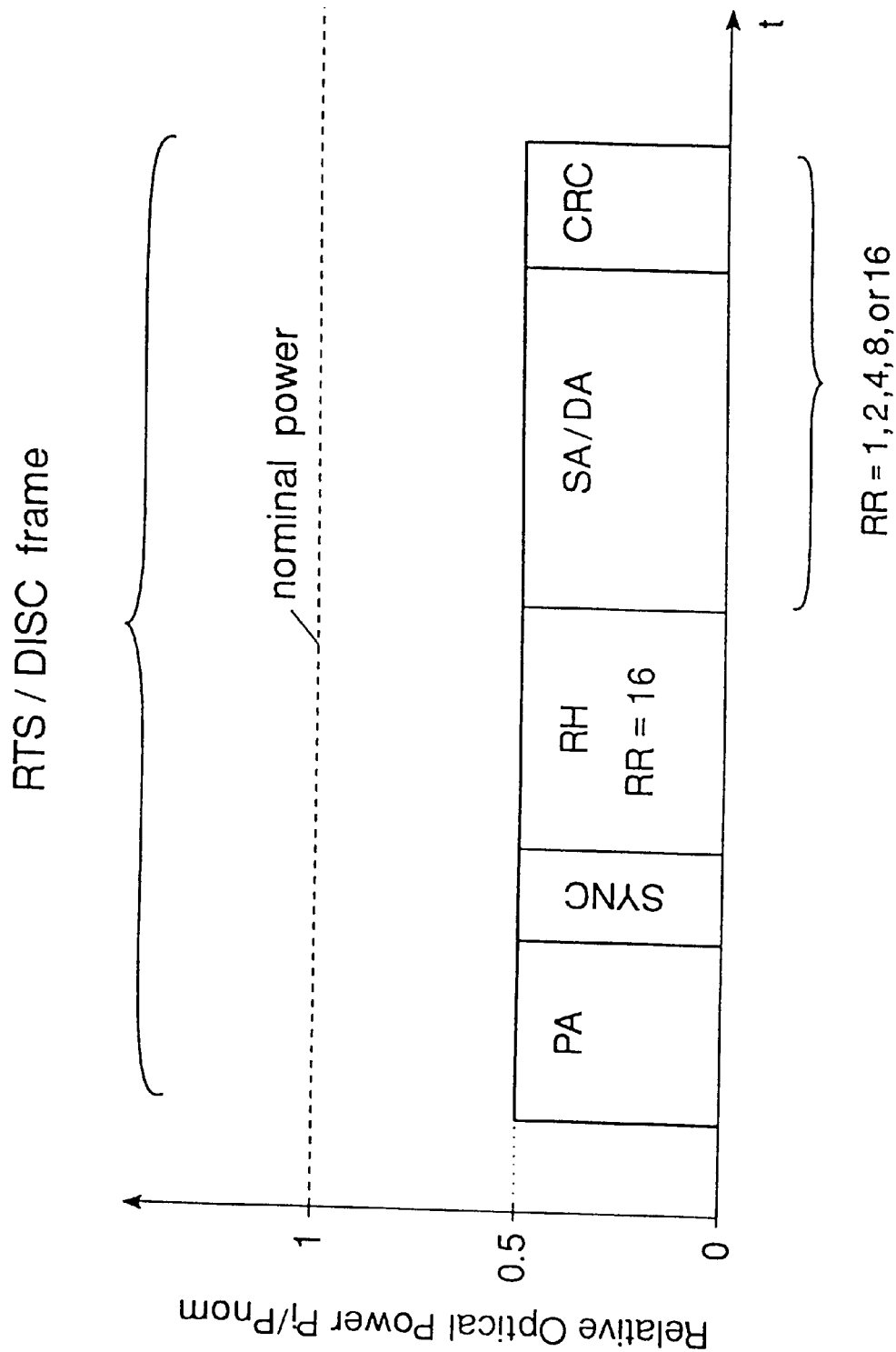
FIG. 1A shows a new RTS/DISC frame with half the nominal power level at which data frames are sent and with variable repetition encoded (RR=1, 2, 4, 8, or 16) SA/DA and CRC fields.

One embodiment of a new RTS frame, as illustrated in FIG. 1A, comprises the standard fields PA, SYNC, and RH which are followed by a SA/DA field and a CRC field. The optical transmission power level of this frame is constant and about 50–75% of the nominal transmission power level at which data frames are sent. The RH field comprises the usual sub-fields for PHY and MAC layer inclusive the sub-field RR indicating repetition coding for the following SA/DA and CRC field. The RH field itself is 16-fold repetition coded (i.e. RR=16) for maximum detection sensitivity. SA/DA field is treated as a short data field with CRC, both coded with the same RR=1, 2, 4, 8, or 16. The RTS transmission power is chosen such that, in combination with the chosen RR for the SA/DA field, correct decoding (checked by CRC in common manner) of the SA/DA field by the destination station is achieved on average for a desired SNR.

The purpose of this method is to obtain a margin against frame loss from colliding frames (for example from stations with poor transceiver parity). For this, it is assumed that the required RR is already known for sending data packets to a particular station. By sending RTS with half the nominal power the transmission distance is about 0.71 that with nominal power. Thus, SA/DA is forced to be false when reaching the receiving station, if the distance is larger. On the average, by using nominal power for data frame transmission, it can then be guaranteed that the channel is relatively good and provides a margin against disturbances. By sending RTS at reduced power and coding the SA/DA and CRC fields with the above mentioned RR, the CRC check for the SA/DA field will only be correct, if the SNR of this link is sufficiently good for the following data packet transmission, i.e. the SA/DA field serves as test for the link quality. A symbol error count is not used here. If the CRC check is incorrect, no CTS is transmitted. Hence, this method ensures that the destination station only responds with a CTS to the sender of RTS if a certain prescribed SNR for the chosen RR is met. By choosing a very good SNR at the expense of achievable transmission distance the above mentioned margin against frame loss is obtained.

Each station participating in a multi-terminal network (communication cell or subcell) requires knowledge of the quality of the link between itself and all other stations. Link Quality Analysis (LQA) can be performed and updated whenever frames are exchanged as described in the above mentioned WO97/25788, for example. Also, a station joining an active network must announce itself to all participants and the mutual LQA must be performed. This can in principle be done as described in the WO publication, however, this method will have to be implemented in software (IrMAC).

To complement this method of LQA based on which rate negotiation can be performed, there are situations where it is required to obtain fast LQA results. For example, when a new station joins an existing network or when it is required that all participating stations renew/update their LQA tables.

Thus, in another embodiment the same frame structure and transmission power is used but with a differentiating sub-field in the RH field and with a broadcast destination address in the DA field. With this sub-field in the RH the RTS frame is designated as a discovery (DISC) frame. Here no specific device is addressed in the DA field and therefore the RTS/DISC frame signals to all stations. For establishing a connection from a first transmitting station A to a second unknown potential receiving station B which is listening to the broadcast address, the station A emits a RTS/DISC frame with SA/DA and CRC at RR=1 which corresponds to the shortest transmission range. If station B can decode SA/DA with correct CRC, it responds with an acknowledgement frame confirming reception with RR=1. Station A then sends data frames with nominal power and RR=1 to station B. If station B cannot decode SA/DA with correct CRC, it sends no reply. In this case station A sends a discovery frame with RR=2 which corresponds to a longer range. After receipt of a reply, station A sends data packets with the corresponding RR. If station A receives no reply, it will continuously send discovery frames with increasing values of RR until a response from station B is obtained, or RR=16 is reached (max. transmission range). Since more than one station B can receive the RTS/DISC frame sent by station A, these stations will answer using the well-known "back-off" method in which each station waits a randomly chosen time period before answering. This reduces the risk of CTS frame collisions.

Figure 1B:
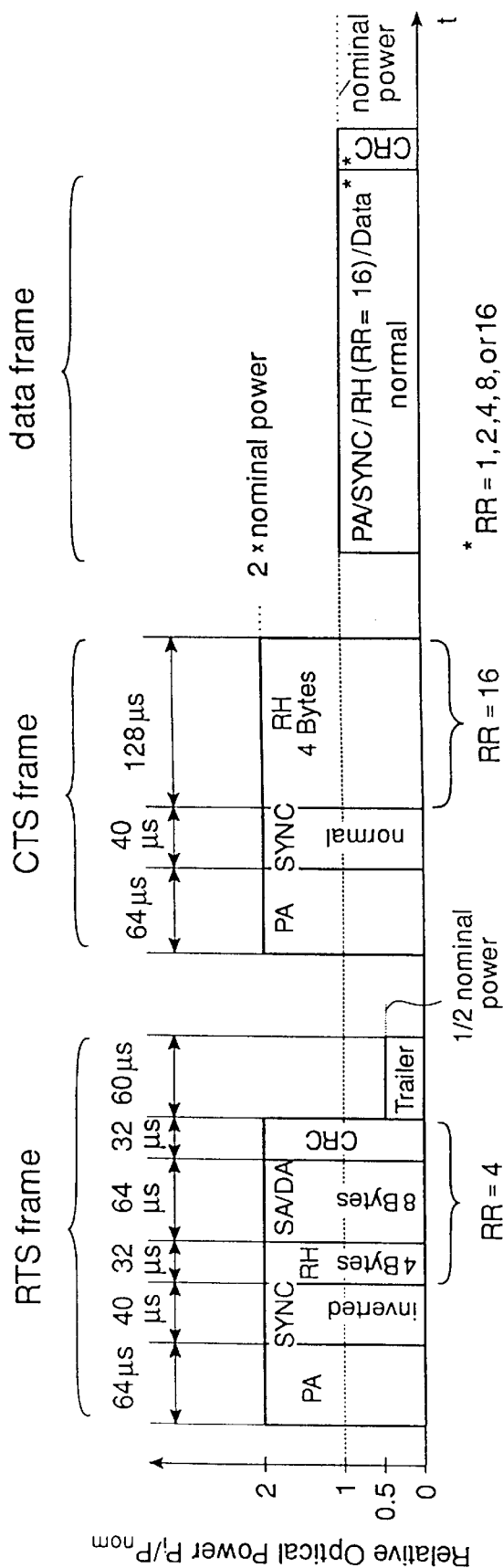
FIG. 1B shows a new RTS frame with a double power level and a trailer with a ½ power level, a CTS frame with double power level, and a standard data frame with nominal power level.

The purpose of the RTS frame is to announce the transmission of a data frame. The transmission range of the RTS frame is required to be the same as the maximum transmission range of a maximum-length data frame with a RR=16, for example. To minimize the time window for potential collision, RTS frames should be as short as possible. Thus, according to a further embodiment, in order to obtain a shorter RTS frame, the optical transmission power of the RTS frame is increased by 3 dB or 1.5 dB compared to the nominal optical transmission power for data frames, and further, the rate reduction factor RR of the RH field and the SA/DA field is set to 4 or 8, respectively. Further, as shown in FIG. 1B, the RTS frame with shorter length can also be provided with an increased dynamic range for LQA by transmitting RTS with two power levels. The depicted RTS frame comprises a first section transmitted at double nominal optical power containing—as already known—the PA, SYNC (inverted), RH, SA/DA, and CRC fields, wherein RH, SA/DA, and CRC are repetition coded at RR=4, and a second section transmitted with ½ nominal power containing a Trailer (TR) field with a sufficient number, for example 100, of 4-PPM symbols to determine the link quality. Please note that in FIGS. 1A and 1B the nominal power is indicated by a dotted horizontal line (relative optical power is unity).

FIG. 1B also shows the CTS and data frames and their chosen power levels. For the CTS frame an extended transmission range (e.g. RR=16) is desirable to improve collision avoidance properties in multi-terminal situations and to accommodate any tolerances in IR channel reciprocity. The CTS frame has double nominal power and a normal encoded SYNC pattern (see below), indicating RH coding with RR=16. Note that the SYNC pattern is also referred to as synchronization word. The data frames are transmitted with nominal optical power, normal coding of RH information (RR=16), and variable data rate (RR=1, 2, 4, 8, or 16).

Figure 2:
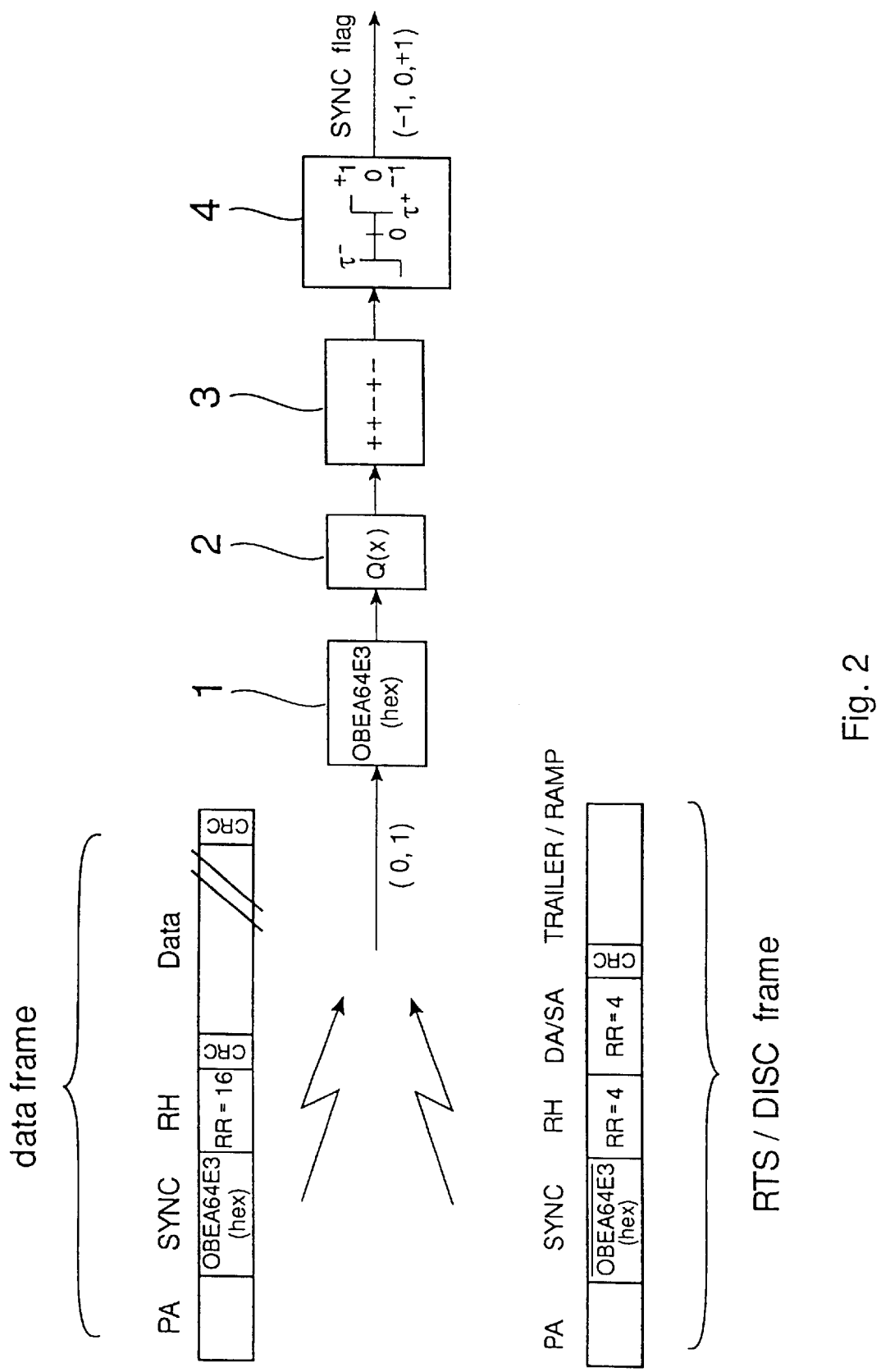
FIG. 2 shows an embodiment for the detection of different types of frames by means of an inverted SYNC sequence.

Since the receiving station does not know at which RR the RH field is coded (except for frames where always RR=16), an additional signaling scheme is required to indicate the different RR which are allowed for the communication system. For this the transmitting station codes the SYNC sequence with different polarity depending on whether the frame contains header/address information coded with RR=4 (as chosen in this embodiment) or RR=16 (maximum, as defined in the aforementioned references). If the RTS frame is coded with RR=4, the SYNC field comprises an inverted synchronization pattern and the receiving station detects a negative correlation peak. The occurrence of this event is then used to inform the modem that the robust header/address is to be decoded with RR=4. In FIG. 2 an embodiment of this scheme is shown wherein the first SYNC sub sequence (hex'0BEA64E3') is inverted. The complete transmitted SYNC sequence is constructed according to the method described in the WO97/25788 publication with the difference that one of the two sequences, here the first, is inverted, if required. In the SYNC field, the sequence hex(0BEA64E3) or its inverse is coded according to a second sequence (e.g. ++−+−) as described in the WO publication to form the complete transmitted SYNC sequence. For the purpose of explaining this invention, the first sequence is inverted; alternatively, the second sequence (++−+−) can be inverted instead (−−+−+). The received SYNC field is processed by a 1st-stage correlator 1 for SYNC detection, a quantizer 2, a 2nd-stage correlator 3 for SYNC detection, and a SYNC decision 4. The output signal (SYNC flag) has then the three possible values −1, 0, or +1 representing SYNC detected/RH: RR=4, no SYNC detected, and SYNC detected/RH: RR=16, respectively. Thus, the SYNC field in the RTS/DISC frame shown in the lower left part of FIG. 2 is indicated as inverted SYNC field.

As already mentioned, the TR field allows an increased dynamic range of LQA by counting illegal 4-PPM symbols. According to the definition of L-slot PPM (L-PPM), illegal symbols means that the received TR field contains symbols either with no pulse or more than one pulse caused by noise. The present prior art method based on counting illegal L-PPM symbols as described in WO97/25788 uses only one power level for all frames. This does not allow to estimate the link quality for data frames using RR=1 since too few symbols are available in the RTS frame to obtain statistically meaningful measurements. With a very good link quality allowing operation at maximum data rate with RR=1, no illegal symbols may be detected within the short trailer sequence, but with long data packets (max. 2048 Bytes), errors may still occur—transmission with RR=2 may then be required. The ½ power level in the TR field artificially increases the error count such that an increased and more accurate error count appears in the trailer. For a given trailer length (number of 4-PPM symbols) there is a defined relation (FIG. 3) between probability of illegal symbols occurring and the link quality (SNR in dB). Thus, the tR field comprises in this embodiment 100 4-PPM symbols transmitted at ½ the nominal optical power. The reduced power level enforces invalid 4-PPM symbols (errors) which can be detected and counted. By table lookup, the required value of RR* can be determined and sent back to the transmitting station via the CTS frame.

Figure 3:
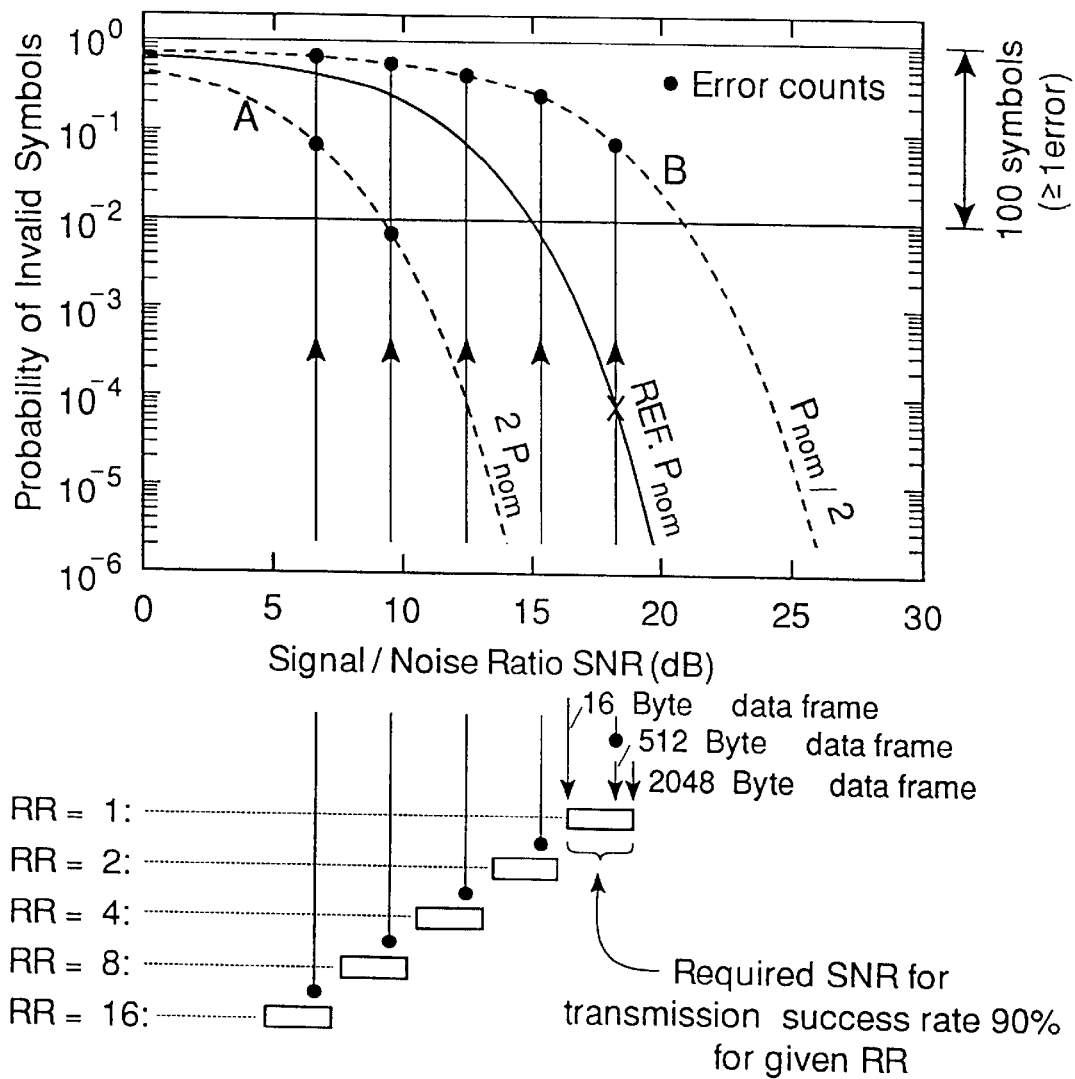
FIG. 3 shows the LQA (Link Quality Analysis) of a RTS frame according to FIG. 1B.

The LQA is now explained in general terms in connection with FIG. 3. The following functions are relevant (see also FIG. 1B):
1. Count illegal L-PPM symbols in received RH and SA/DA checked with CRC and transmitted with increased power, apply hardware thresholds.
2. Count illegal L-PPM symbols in the TR field, apply hardware threshold.
3. Determine recommended rate reduction factor RR* based on the number of illegal L-PPM symbols (error count) and insert RR* in the CTS frame without IrMAC (part of software protocol stack) intervention.
4. Error count (=number of illegal L-PPM symbols) thresholds determining RR* are chosen such that a sufficient SNR is obtained, e.g. for transmission success rate of 99% with RR=RR*. If the SNR, estimated based on the received RTS frame, is not sufficient to support for example 99% error-free data transmission with RR=16 no CTS frame is sent in return. This establishes the minimum required link SNR for reliable transmission at RR=16.

FIG. 3 shows the probability of invalid 4-PPM symbols as a function of the SNR for two different power levels ($2P_{nom}$, $P_{nom}/2$) relative to the nominal reference (REF. $P_{nom}$) according to the RTS frame of FIG. 1B. The figure shows that with 100 symbols checked, no meaningful error count is obtained for RR=1 (point marked X on the reference curve) and nominal power level $P_{nom}$. As an example, from the points shown on the curves follows which error counts can be expected with 100 checked symbols. The points are shown for a SNR required to achieve transmission success rate of 90% for 512 Byte frames with nominal power levels $P_{nom}$. Respective points can be found for 16 Byte or 2048 Byte frames. Based on these reference points, error count ranges can be determined and thresholds can be defined which are then used in a practical implementation to determine the RR* for insertion in the CTS frame as described above. For a SNR between 5–10 dB it may be advantageous to use the error obtained for both power levels (dashed curve A and B). This may help distinguishing from a SNR above 10 dB.

Figure 4:
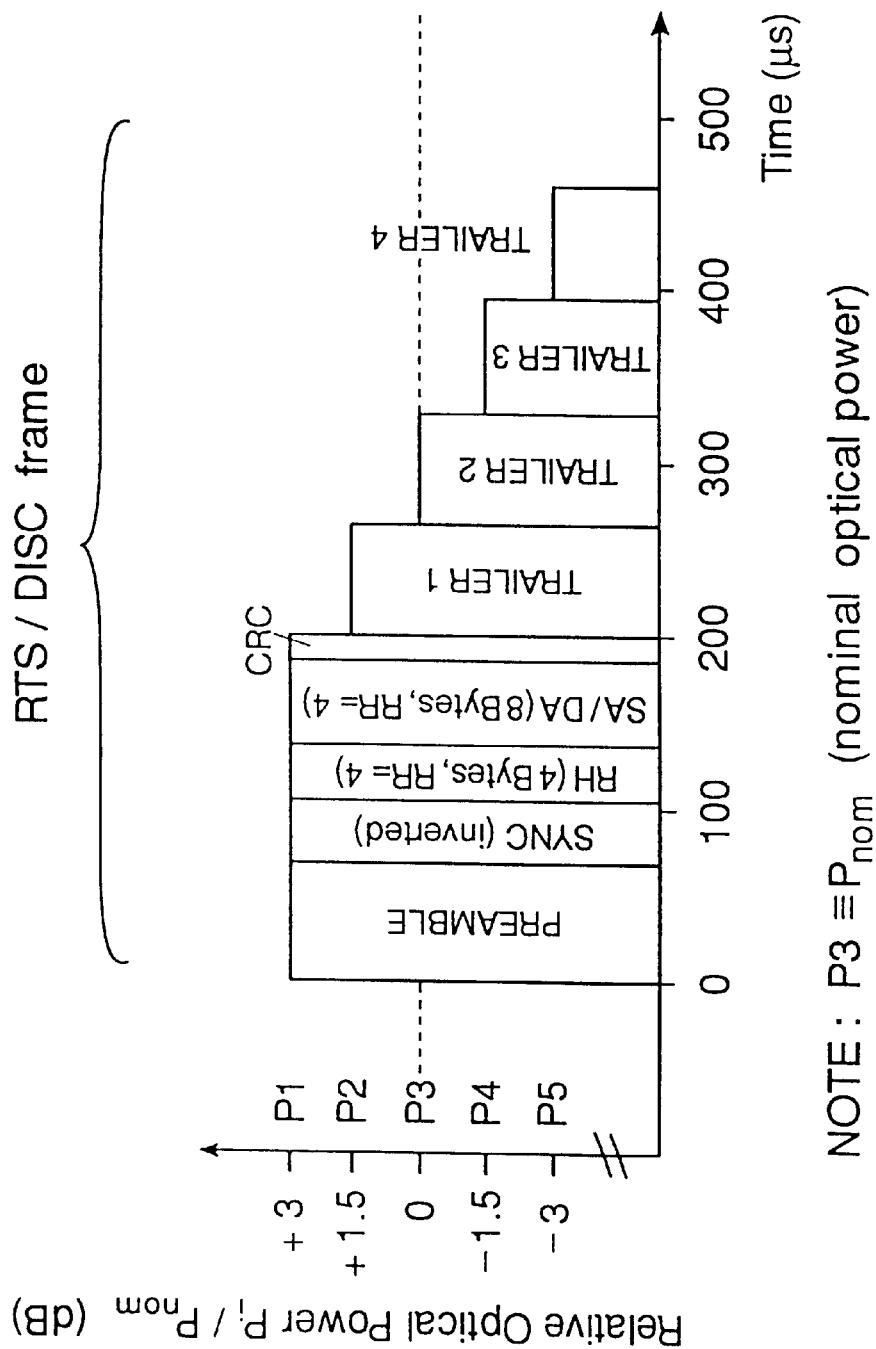
FIG. 4 shows another RTS/DISC frame with a trailer comprising four ramped power levels.
Figure 5:
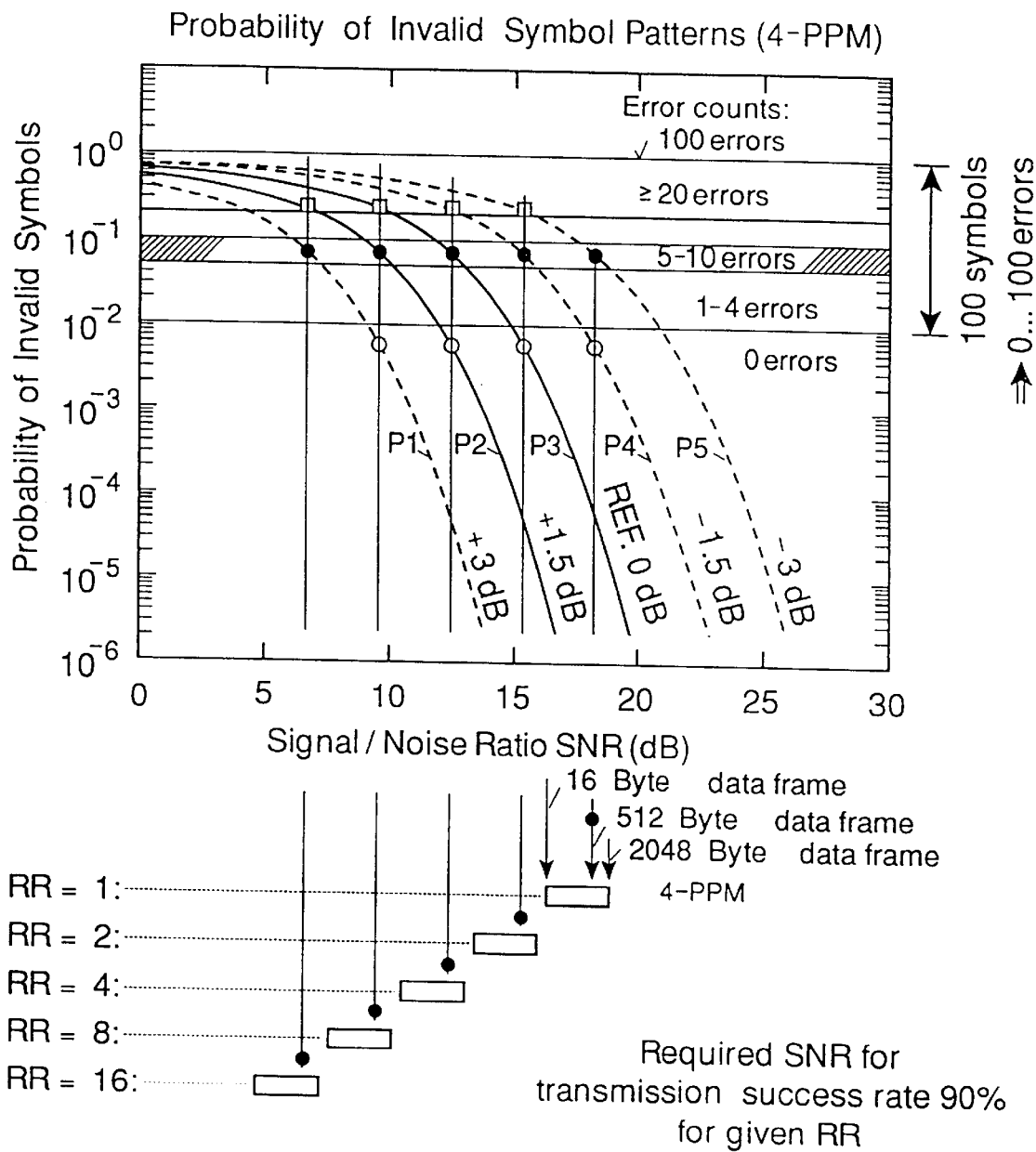
FIG. 5 shows the LQA (Link Quality Analysis) of a RTS frame according to FIG. 4.
Figure 6:
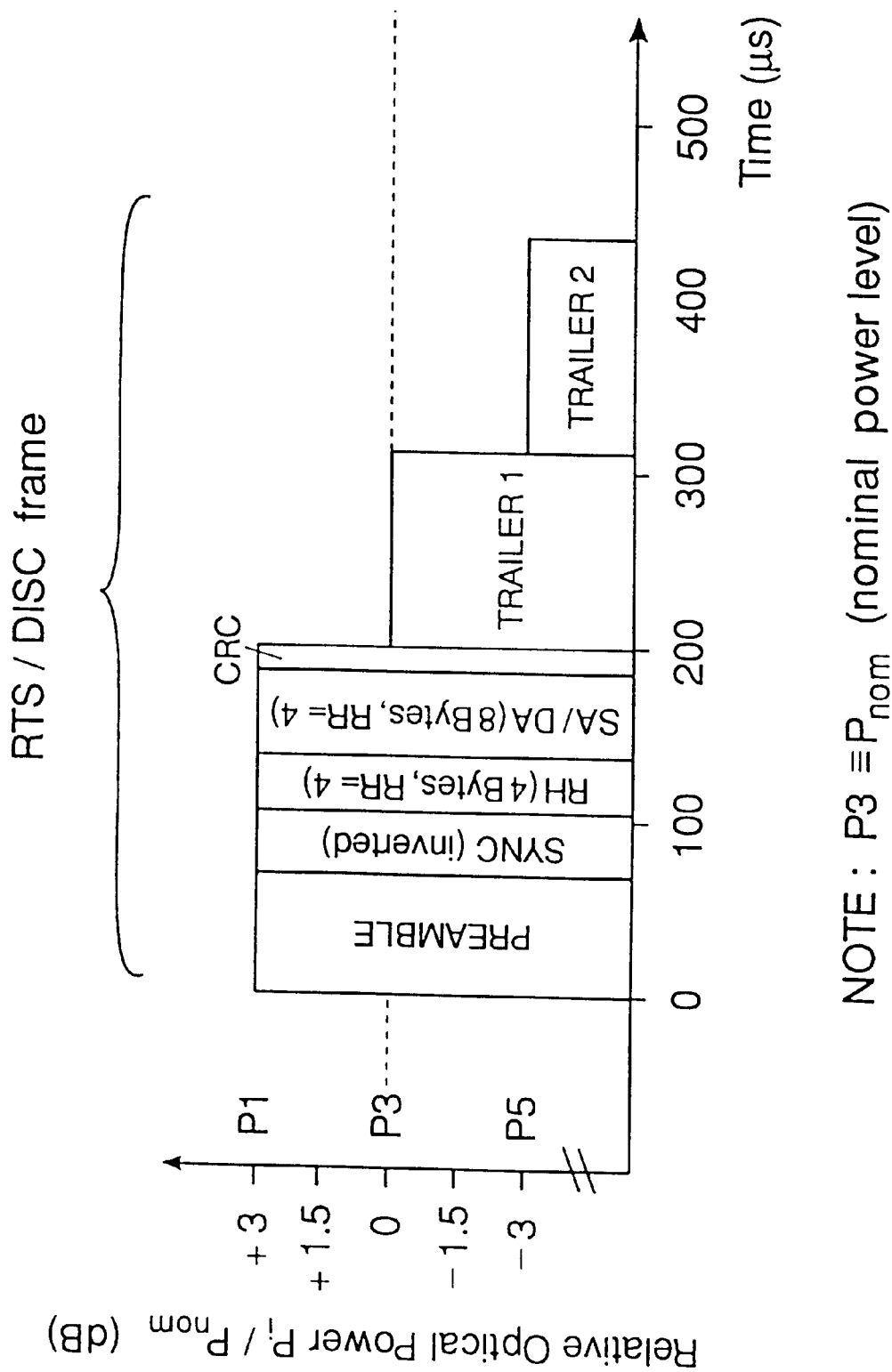
FIG. 6 shows a further RTS/DISC frame with a modified power-ramped trailer.
Figure 7:
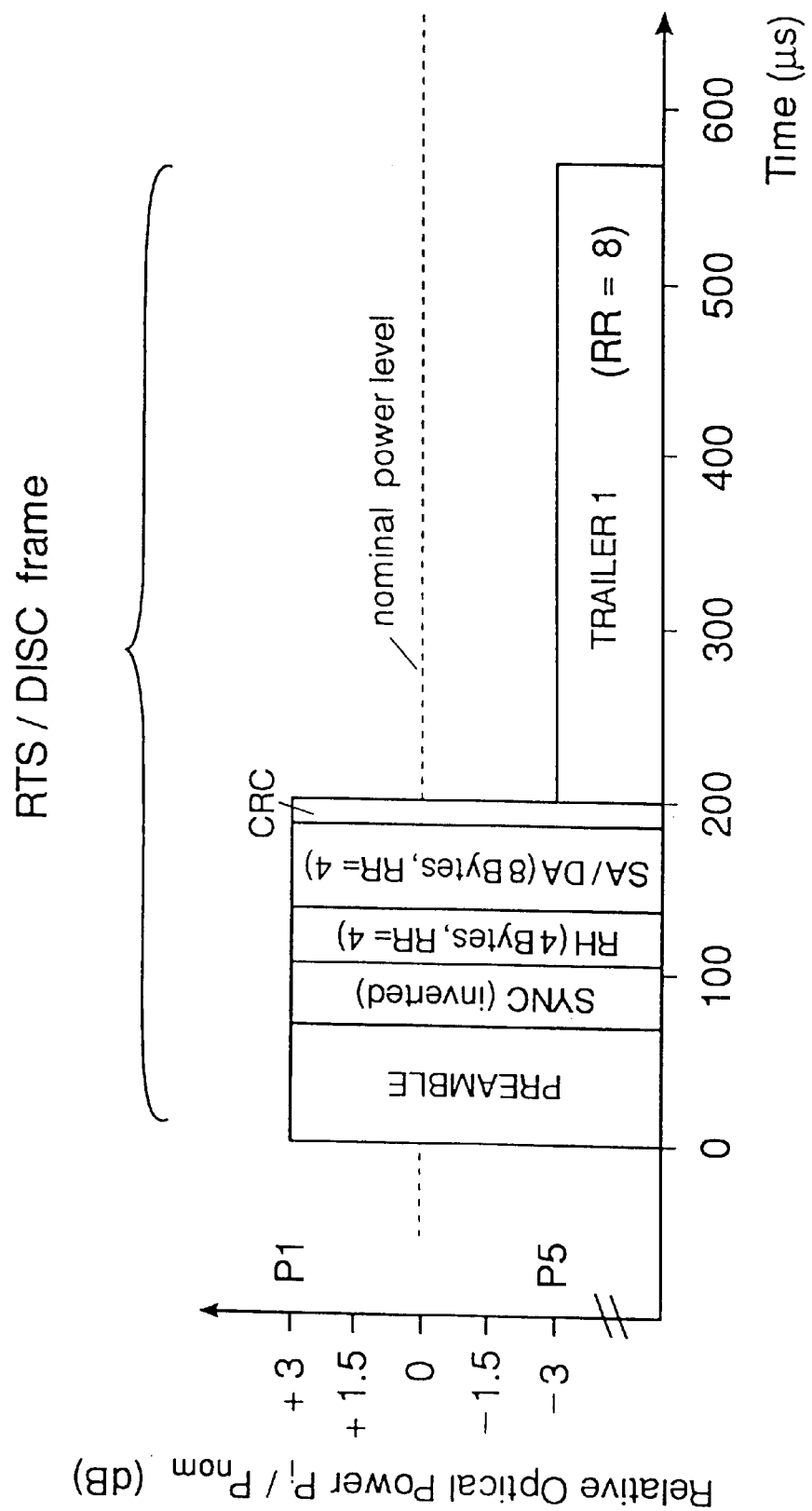
FIG. 7 shows another RTS/DISC frame with a trailer having a ½ power level and RR=8.

The trailer can be generalized to have more than one power level. This has the advantage that more performance curves become available for error counting and more precise measurements are possible. It is a disadvantage of this approach that the trailer sequence becomes longer (see FIGS. 1B and 4 for comparison). However, the RTS frame is still shorter than a prior art RTS frame. As depicted in FIG. 4, the RTS frame comprises a power-ramped trailer with four different power levels. For Air devices, for example, it is suitable to use five optical power levels, each separated by a 1.5 dB step relative to its neighbors. This provides five error counts with equal statistical properties over the entire range of SNRs. In the SA/DA field and in each following sub-trailer in the TR field 128 symbols are transmitted and 100 symbols are used for error counting (28 symbols are allowed for settling of the gain control circuitry). This scheme is illustrated in FIG. 5. It shows the same threshold (5–10 errors) when evaluating the error counts for the different power levels. The error counts for the neighboring power levels can also be used for a given power level to improve the SNR estimate even more. For evaluating the link quality for the determination of RR*, the required RR* is determined for a given length of each sub-trailer, for example 100 symbols, by individually counting illegal symbols for each sub-trailer at different power level. The sub-trailer delivering an error count of, for example, 5–10 errors indicates the required RR* based on the curves shown in FIG. 5. FIG. 6 and FIG. 7 show further variants of new RTS/DISC frames, according to the present invention. The idea here is to use signal processing in modems to achieve the equivalent of five different power levels even though only two and three power levels are used, respectively. For example, in FIG. 6 the missing power level P2 (1.5 dB optical) can be obtained virtually by evaluating Trailer 1 with RR=2 detection before counting illegal 4-PPM symbols, and similar for the missing power level P4. Here, in each sub-trailer 228 symbols are transmitted and 200 symbols are used for error counting (RR=1 and RR=2). In FIG. 7 error counts equivalent to power levels P4, P3, and P2 can be obtained by evaluating the trailer with RR=2, RR=4, and RR=8 detection, respectively. P1 and P5 are evaluated with RR=1 detection. In this embodiment the TR field contains 828 4-PPM symbols transmitted with RR=8, and 800 symbols are used for error counting with averaging detection for RR=1, 2, 4, and 8, respectively The RTS frames shown in FIG. 6 and FIG. 7 can also be used as discovery frames (DISC frame), as already discussed above. In case where no specific device is addressed, the DA entry in FIGS. 6 and 7 signals to all stations and all stations can perform LQA with respect to the transmitting address SA and thus adapt their LQA table. This "single shot" method might be implemented in hardware.

Figure 8:
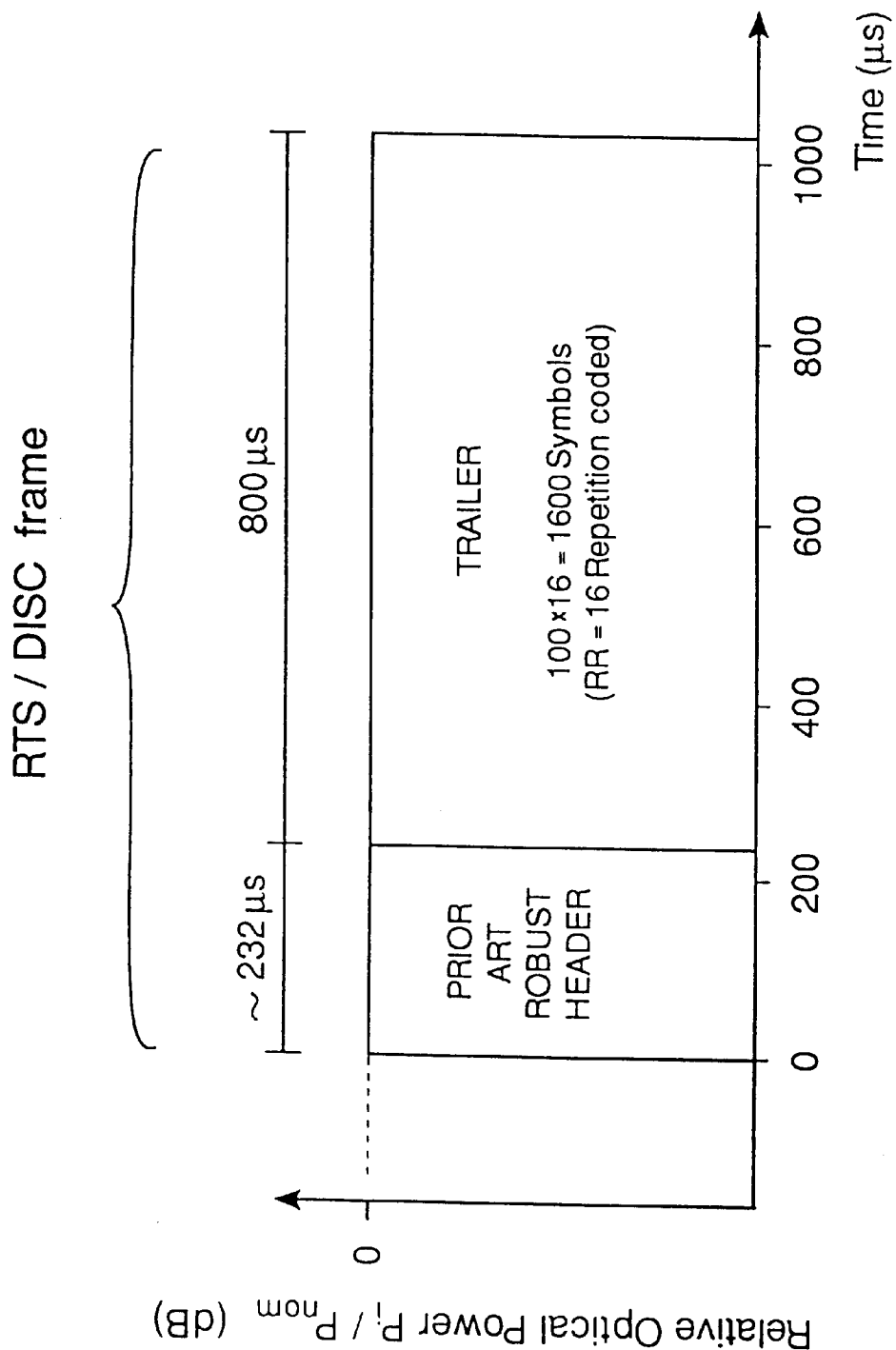
FIG. 8 shows a DISC frame with a constant nominal power level with a RR=16 coded trailer.

In cases where only one power level is possible (hardware constraints) the discovery frame in FIG. 8 can be used with a trailer RR=16 coded. The virtual five power levels for LQA can be obtained by first desensitizing the receiving station, for example by 9 dB (electrical SNR), and then use RR=1, 2, 4, and 16 averaging detection to obtain error counts corresponding to five different optical power levels spaced by 1.5 dB. Further, the receiver sensitivity can be controlled by means of threshold variation in a decision device.

In another embodiment the same frame types as described in the mentioned IrDA Meeting publication can be used, but with the use of an inverted SYNC pattern as described above for all frame types when operating in an energy saving mode with reduced and constant optical power level, for example with 5% of nominal power for all frame types. With this method the power consumption is reduced when transmitting data over a very short distance (~0.5–1 m) and the data throughput is increased for the members of a "picocell" (also referred to as subcell) which is formed. When using the inverted SYNC pattern, the receiving station does not detect the presence of frames from distant stations operating with the normal SYNC pattern. Thus, signals from members of the picocell can capture the channel; this results in increased data throughput. On the other hand, the emitted power from the members of the picocell is very small, causing minimum interference to other distant stations.

What is claimed is:

1. Method for wireless optical communication between a transmitting station and a receiving station, whereby said transmitting station provides a Request-to-Send (RTS) frame to said receiving station to announce the transmission of a data frame, said receiving station provides a Clear-to-Send (CTS) frame to said transmitting station in case of correct reception of the Request-to-Send (RTS) frame, and said transmitting station subsequently sends a data frame at a nominal transmission power level to the receiving station, said Request-to-Send (RTS) frame comprising a Preamble field (PA), a Synchronization field (SYNC), a Robust Header field (RH), a Source Address/Destination Address field (SA/DA), and a Cyclic Redundancy Check field (CRC), said Request-to-Send (RTS) frame being transmitted at a first optical power level and said Robust Header field (RH) being repetition coded using a first Rate Reduction, whereby either said first optical power level is higher than said nominal transmission power level and said first Rate Reduction is lower than a maximum Rate Reduction (RR), or said first optical power level is lower than said nominal transmission power level and said first Rate Reduction is equal to said maximum Rate Reduction (RR).

2. The method of claim 1, wherein said first optical power level is lower than said nominal transmission power level, and a first Rate Reduction of 16 is used for said Robust Header field (RH).

3. The method of claim 2, wherein a second Rate Reduction of 1, 2, 4, 8, or 16 is used for the transmission of the Source Address/Destination Address field (SA/DA), and the following Cyclic Redundancy Check field (CRC).

4. The method of claim 3, wherein the first optical power level is chosen such that in combination with said second Rate Reduction of the Source Address/Destination Address field (SA/DA) its correct decoding by the receiving station is achieved on average for a desired Signal-to-Noise Ratio (SNR).

5. The method of claim 2, wherein the first optical power level is in the range of 50% to 75% of the nominal transmission power level.

6. The method of claim 1, wherein said first optical power level is chosen such that in combination with said first Rate Reduction a predefined reliability of transmission between said transmitting station and said receiving station is ensured.

7. The method of claim 1, wherein said Robust Header field (RH) comprises a differentiating sub-field, which designates said Request-to-Send (RTS) frame as a discovery frame (DISC), and a broadcast destination address in said Source Address/Destination Address field (SA/DA).

8. The method of claim 1, wherein said Preamble field (PA), Synchronization field (SYNC), and Robust Header field (RH) of said Request-to-Send (RTS) frame and of said Clear-to-Send (CTS) frame are transmitted with said first optical power level being higher than said nominal transmission power level, and said Request-to-Send (RTS) frame further comprises a trailer with at least one Trailer field (TR) which follows the Request-to-Send (RTS) frame's Cyclic Redundancy Check field (CRC) with a second optical power level being lower than said nominal transmission power level, said first optical power level and said first Rate Reduction being correspondingly chosen to produce equal detection sensitivity as with a Rate Reduction (RR) of 16 and nominal transmission power level.

9. The method of claim 8, wherein said first optical power level is double the nominal transmission power level and wherein said first Rate Reduction is 4.

10. The method of claim 8, wherein said second optical power level of said at least one Trailer field (TR) is half the nominal transmission power level.

11. The method of claim 8, wherein said trailer comprises several Trailer fields (TR) with different optical power levels.

12. The method of claim 11, wherein said different optical power levels decrease in 1.5 dB steps starting with twice the nominal transmission power level.

13. The method of claim 1, wherein said Synchronization field (SYNC) comprises a pattern which is inverted in relation to a standard SYNC pattern to indicate a different Rate Reduction (RR).

14. The method of claim 1, wherein for reduced power consumption said Request-to-Send (RTS) frame and said Clear-to-Send (CTS) frame are transmitted with a third optical power level being lower than said nominal transmission power level and wherein an inverted standard SYNC pattern is used in said Synchronization field (SYNC) to indicate a reduced third optical power level.

15. The method of claim 1, wherein said Clear-to-Send (CTS) frame also comprises a Preamble field (PA), a Synchronization field (SYNC), and a Robust Header field (RH).

16. The method of claim 15, wherein said Clear-to-Send (CTS) frame is transmitted at an optical power level being different from said nominal transmission power level.

17. The method of claim 1, wherein said data frame is repetition coded.

18. Frame for optical communication between a transmitting station and a receiving station which is used to announce the transmission of a data frame which is transmitted at a nominal transmission power level, said frame comprising:
   a Preamble (PA) field comprising a periodic sequence of pulses with defined period, the number of slots per period and their contents being known to said receiving station,
   a Synchronization (SYNC) field comprising a unique synchronization word being known to said receiving station,
   a Robust Header (RH) field comprising information about the type of said data frame, which modulation type is used for the transmission of said data frame, and how often each pulse position modulation (PPM) symbol of the following fields will be repeated,
   a Source Address/Destination Address (SA/DA) field, repetition coded according to said information comprised in said Robust Header (RH) field, and
   a Cyclic Redundancy Check (CRC) field, repetition coded according to said information comprised in said Robust Header (RH) field,
wherein said frame is transmitted at a first optical power level being different from said nominal transmission power level, and wherein said Robust Header (RH) field is repetition coded with a corresponding first Rate Reduction.

19. The frame of claim 18, wherein said first Rate Reduction is equal to said maximum Rate Reduction (RR) and wherein said synchronization word in the Synchronization (SYNC) field comprises an inverted standard synchronization word.

20. The frame of claim 18, comprising a Trailer (TR) field following said Cyclic Redundancy Check (CRC) field for Link Quality Analysis (LQA) with an optical power level being lower than said nominal transmission power level.

21. The frame of claim 18, comprising a Trailer (TR) field for Link Quality Analysis (LQA) with a set of different optical power levels.

22. The frame of claim 21, wherein said set of different optical power levels comprises four different optical power levels being ramped-down in 1.5 dB steps.

23. The frame of claim 18, comprising a DISC frame having a Trailer (TR) field following a conventional Robust Header field, said Trailer (TR) field being repetition coded with a Rate Reduction of 16.

24. Request-to-Send (RTS) frame used for announcement of optical transmission of a data frame from a transmitting station to a receiving station, said data frame being transmitted at a nominal transmission power level and the data comprised in said data frame being repetition coded, said Request-to-Send (RTS) frame comprising:
   a Preamble field (PA),
   a Synchronization field (SYNC),
   a Robust Header field (RH),
   a Source Address/Destination Address field (SA/DA), and
   a Cyclic Redundancy Check field (CRC),
said Request-to-Send (RTS) frame being transmitted at a first optical power level, and
said Robust Header field (RH) being repetition coded using a first Rate Reduction, whereby either
   said first optical power level is higher than said nominal transmission power level and said first Rate Reduction is lower than a maximum Rate Reduction (RR), or
   said first optical power level is lower than said nominal transmission power level and said first Rate Reduction is higher than said maximum Rate Reduction (RR).

25. The Request-to-Send (RTS) frame of claim 24, wherein said first optical power level is in the range of 50% to 75% of said nominal transmission power level.

* * * * *

UNITED STATES PATENT AND TRADEMARK OFFICE
CERTIFICATE OF CORRECTION

PATENT NO. : 6,643,469 B1
DATED : November 4, 2003
INVENTOR(S) : Gfeller et al.

It is certified that error appears in the above-identified patent and that said Letters Patent is hereby corrected as shown below:

Column 9,
Line 28, after "Fig. 5." please insert a paragraph break by deleting "FIG. 5. FIG. 6 and FIG. 7 show further variants of new" and inserting
-- FIG. 5.
  FIG. 6 and FIG. 7 show further variants of new --.

Signed and Sealed this

Twenty-seventh Day of January, 2004

JON W. DUDAS
*Acting Director of the United States Patent and Trademark Office*